US009615704B1

(12) United States Patent
Becker

(10) Patent No.: US 9,615,704 B1
(45) Date of Patent: Apr. 11, 2017

(54) CLEANING APPARATUS FOR AN AIR HANDLING UNIT

(71) Applicant: Kevin K. Becker, Yankton, SD (US)

(72) Inventor: Kevin K. Becker, Yankton, SD (US)

(*) Notice: Subject to any disclaimer, the term of this patent is extended or adjusted under 35 U.S.C. 154(b) by 0 days.

(21) Appl. No.: 15/218,565

(22) Filed: Jul. 25, 2016

Related U.S. Application Data

(63) Continuation of application No. 15/091,070, filed on Apr. 5, 2016.

(51) Int. Cl.

| | |
|---|---|
| ***B23Q 3/18*** | (2006.01) |
| ***A47L 7/00*** | (2006.01) |
| ***B08B 3/02*** | (2006.01) |
| ***A47L 9/00*** | (2006.01) |

(52) U.S. Cl.
CPC ............. *A47L 7/0004* (2013.01); *A47L 9/009* (2013.01); *B08B 3/02* (2013.01)

(58) Field of Classification Search
CPC .............. B62B 3/008; B62B 1/00; B62B 5/00
See application file for complete search history.

(56) References Cited

U.S. PATENT DOCUMENTS 4,632,627 A 12/1986 Swallows
5,141,211 A * 8/1992 Adams, Jr. .............. B60C 25/04 269/16
5,806,947 A * 9/1998 Meisner ................... B25H 1/12 211/70.6
5,927,745 A * 7/1999 Cunningham ......... A47B 31/04 108/118
6,619,065 B1 9/2003 Burton
6,929,250 B2 8/2005 Blake
7,188,824 B2 3/2007 Blake
7,347,409 B2 * 3/2008 Goza .................... B25H 1/0007 254/10 B
7,647,681 B1 * 1/2010 Harris ..................... B25B 5/061 269/17
8,464,994 B2 6/2013 Chiu
8,740,207 B2 6/2014 Lawrence
8,910,970 B2 12/2014 Chen
9,132,543 B2 9/2015 Bar-Erez
9,149,926 B2 10/2015 Chen
9,150,231 B2 10/2015 De Jong

FOREIGN PATENT DOCUMENTS

WO 2004043762 5/2004

* cited by examiner

*Primary Examiner* — Lee D Wilson
(74) *Attorney, Agent, or Firm* — Jeffrey A. Proehl; Woods, Fuller Shultz & Smith, P.C.

(57) ABSTRACT

An apparatus for supporting an air handling unit during servicing may comprise a support tray which defines a space for receiving the unit and may include opposite sides and opposite ends, with a front side and top of the tray being substantially open such that the is movable through the front side into the support tray. The apparatus may also include a support frame supporting the support tray above a ground surface and wheels on the support frame. The support frame may be configured to permit the tray to tilt end to end with respect to the support frame to adjust heights of the ends and to permit the tray to tilt side to side with respect to the support frame to adjust a height of the front side of the tray.

22 Claims, 9 Drawing Sheets

CLEANING APPARATUS FOR AN AIR HANDLING UNIT

BACKGROUND

Field

The present disclosure relates to cleaning apparatus and more particularly pertains to a new cleaning apparatus for an air handling unit to facilitate simple and effective cleaning of interior surfaces of the air handling unit.

SUMMARY

The present disclosure relates to an apparatus for temporarily supporting an air handling unit during servicing of the unit. The apparatus may comprise a support tray defining a space for removably receiving the air handling unit, and the support tray may have opposite sides and opposite ends with a front side and top of the tray being substantially open such that the air handling unit is movable through the front side into the space of the support tray. The apparatus may also include a support frame supporting the support tray above a ground surface on which the frame is rested, and a plurality of wheels mounted on the support frame to permit the frame to move across the ground surface. The support frame may be configured to permit the support tray to tilt end to end with respect to the support frame to adjust heights of the opposite ends of the support tray above the surface. The support frame may be configured to permit the support tray to tilt side to side with respect to the support frame to adjust a height of the front side of the support tray above the surface.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
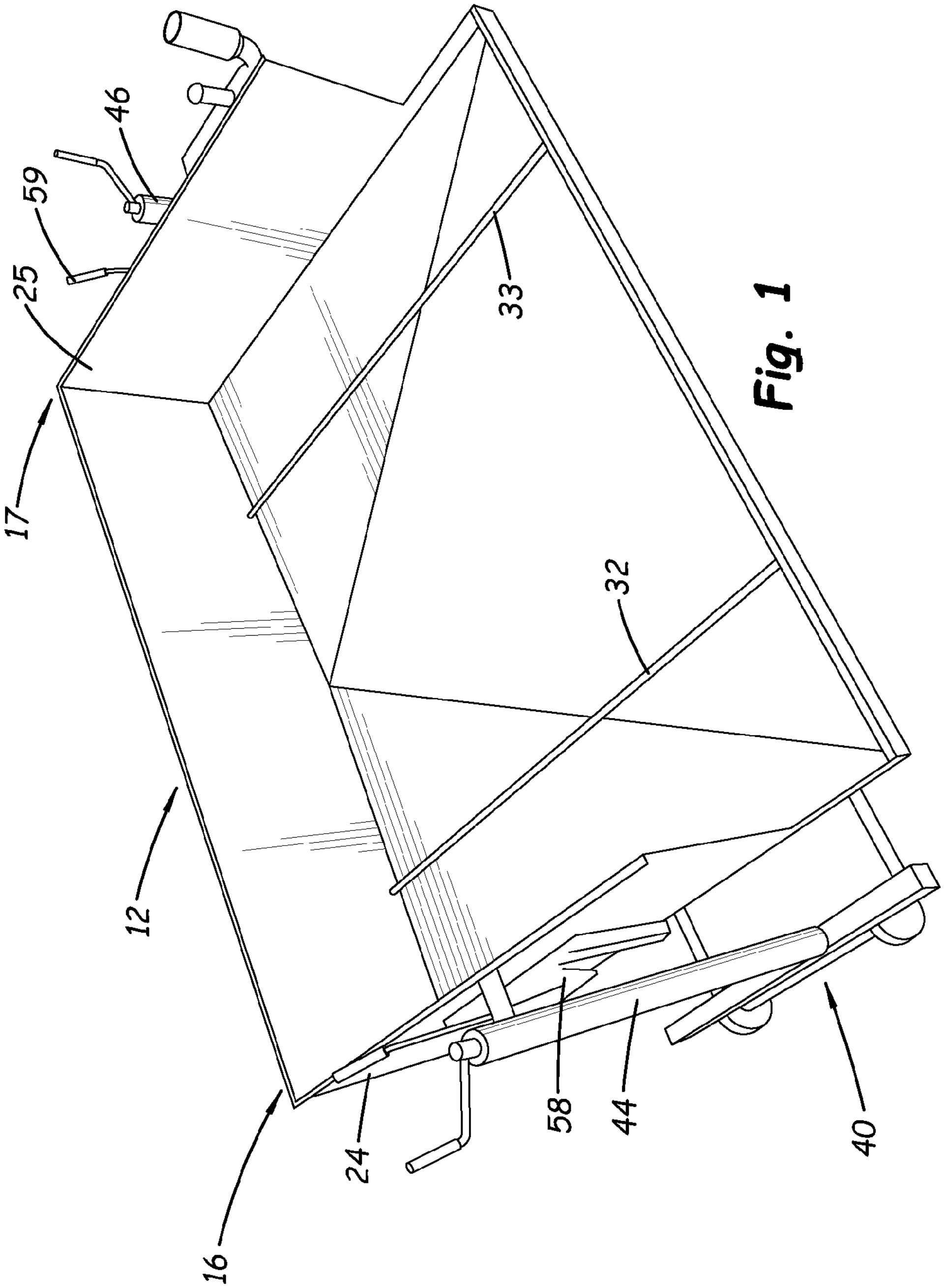
FIG. 1 is a schematic top perspective view of a new cleaning apparatus for an air handling unit according to the present disclosure.
Figure 2:
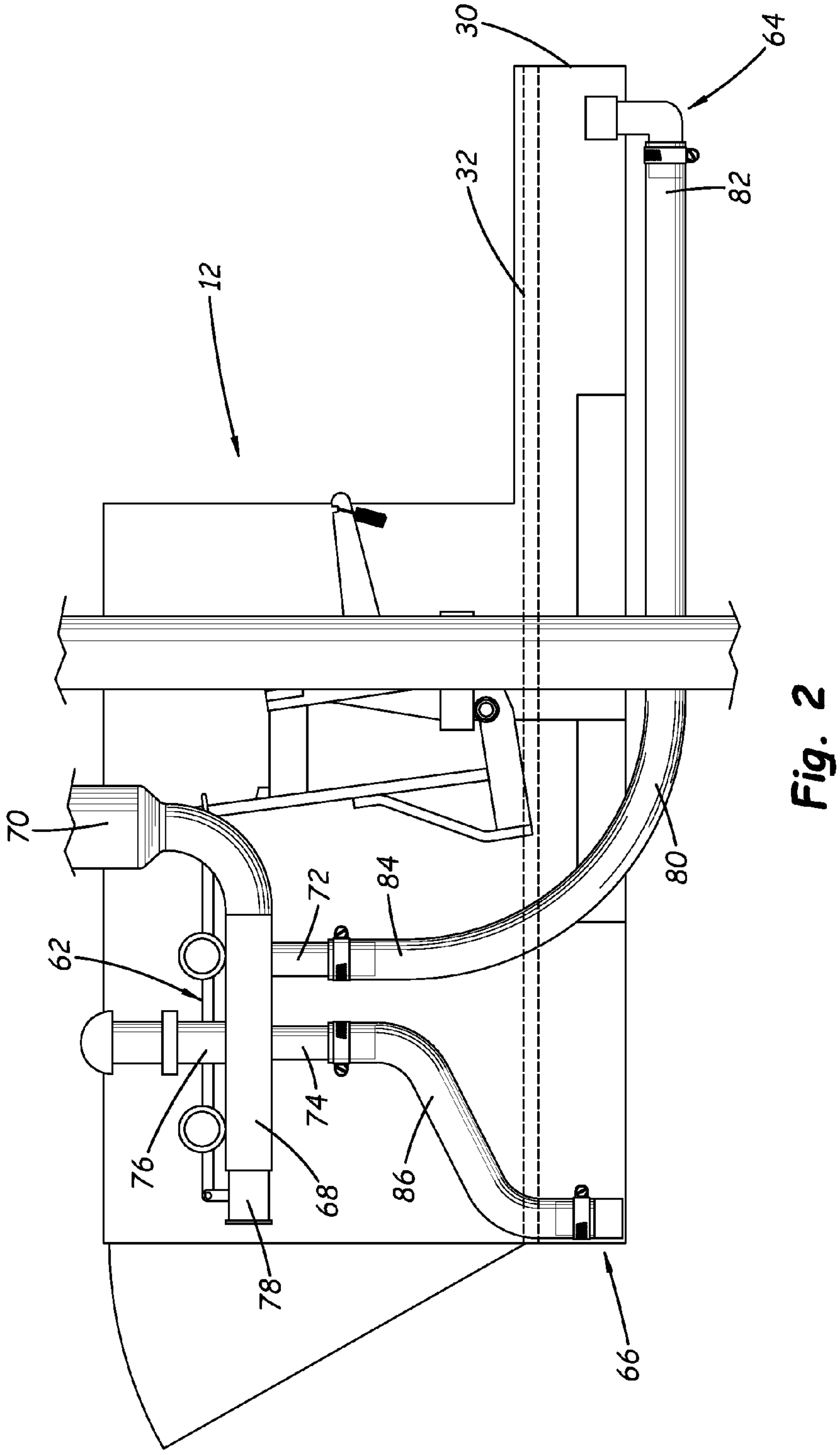
FIG. 2 is a schematic end view of the apparatus, according to an illustrative embodiment.
Figure 3:
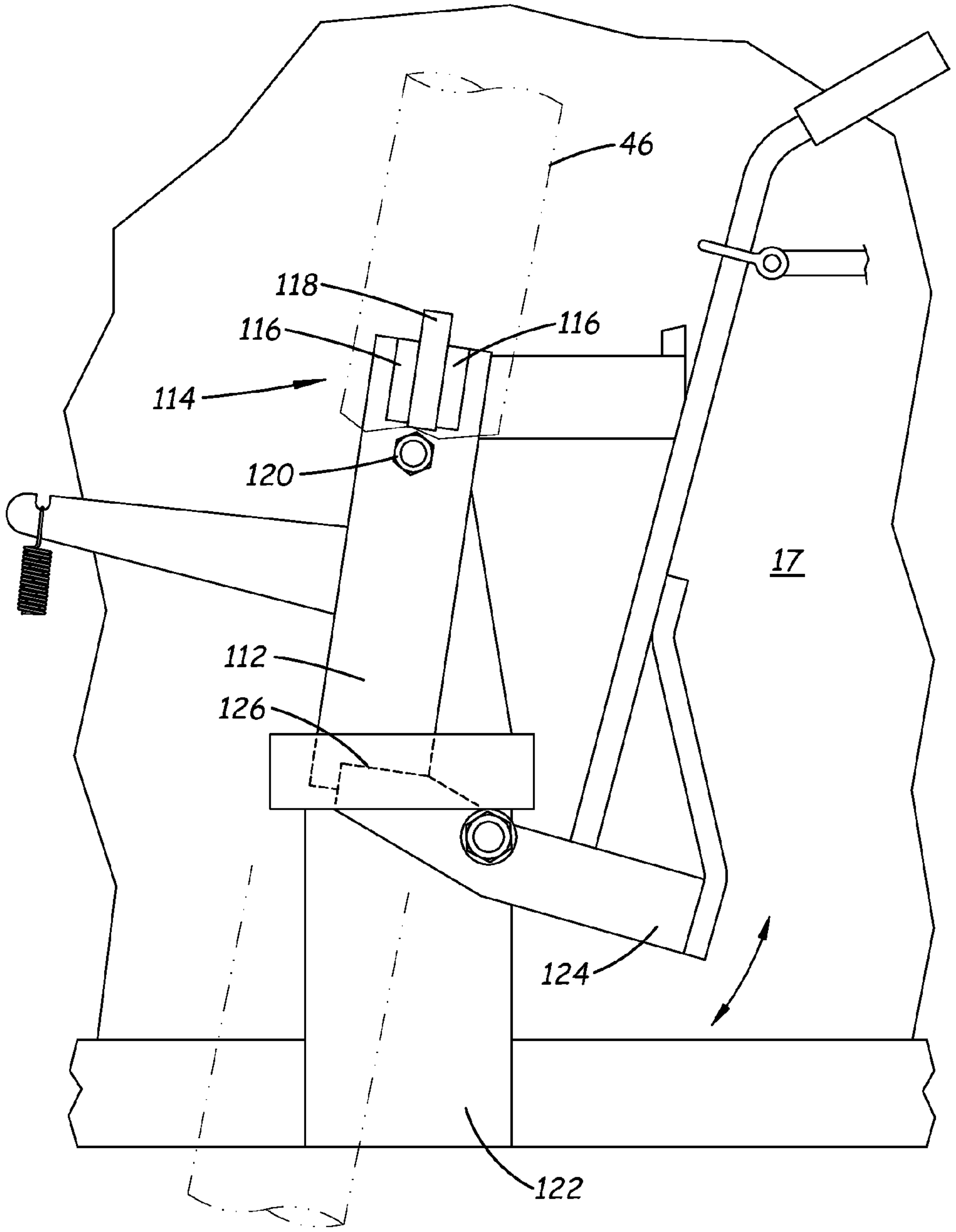
FIG. 3 is a schematic end view of the support tray and the support frame with portions removed to show details of the pivot joints and the locking assembly, according to an illustrative embodiment.
Figure 4:
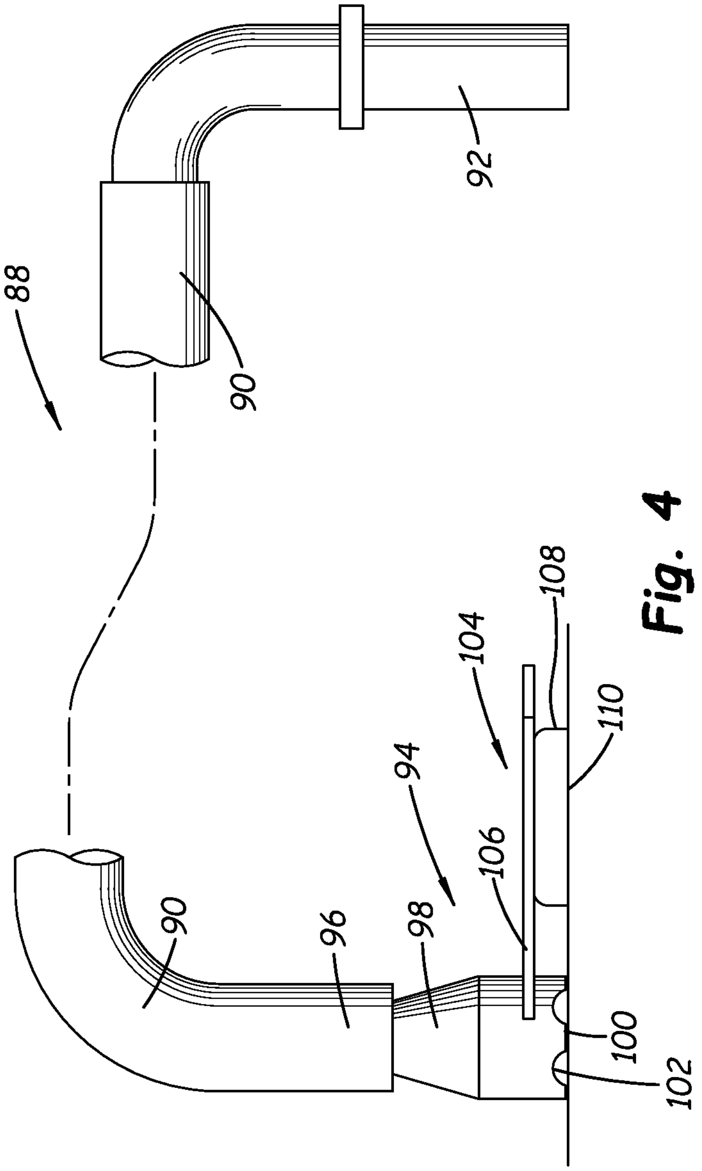
FIG. 4 is a schematic top view of the movable drain structure, according to an illustrative embodiment.
Figure 5:
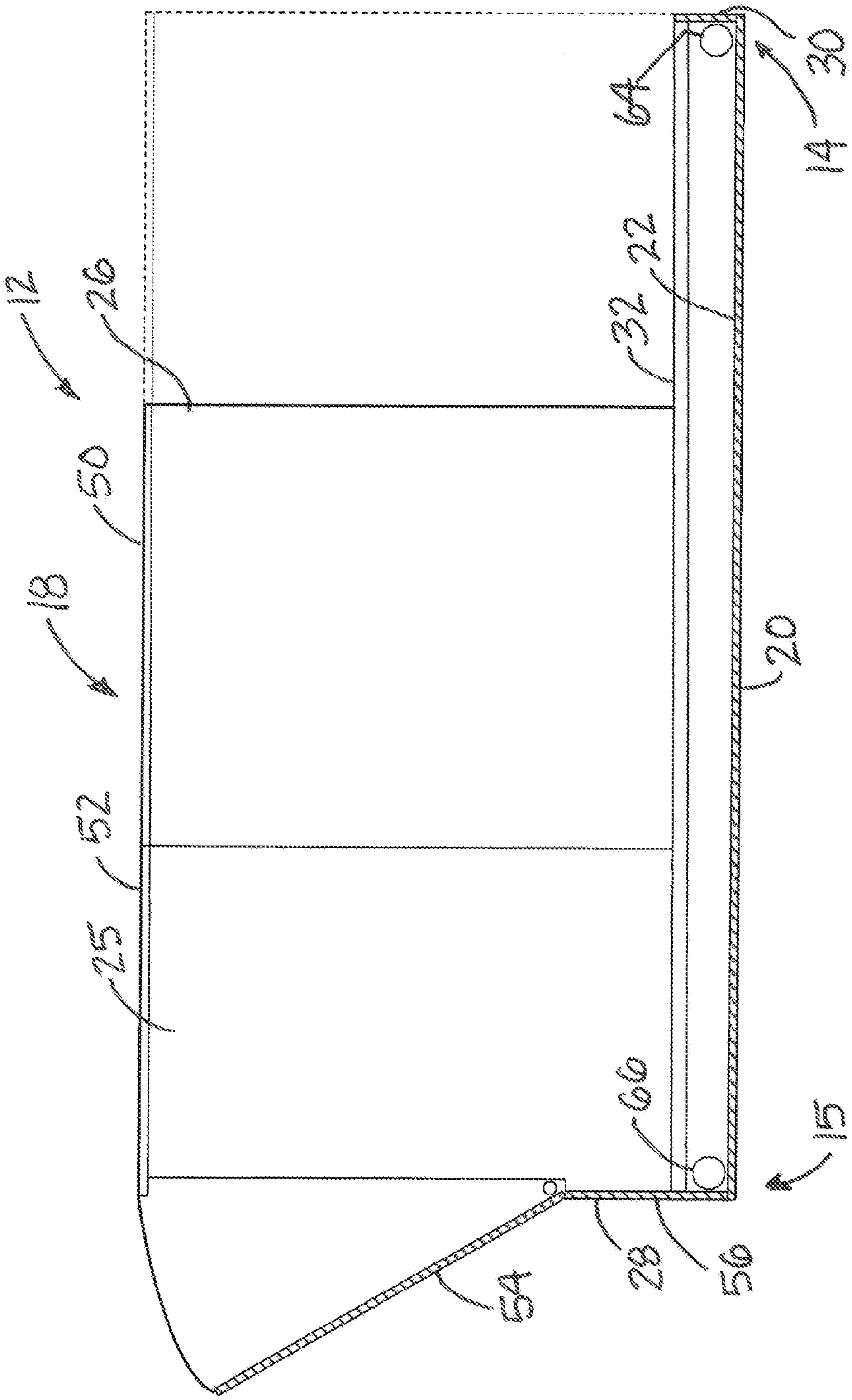
FIG. 5 is a schematic end sectional view of the support tray of the apparatus, according to an illustrative embodiment.
Figure 6:
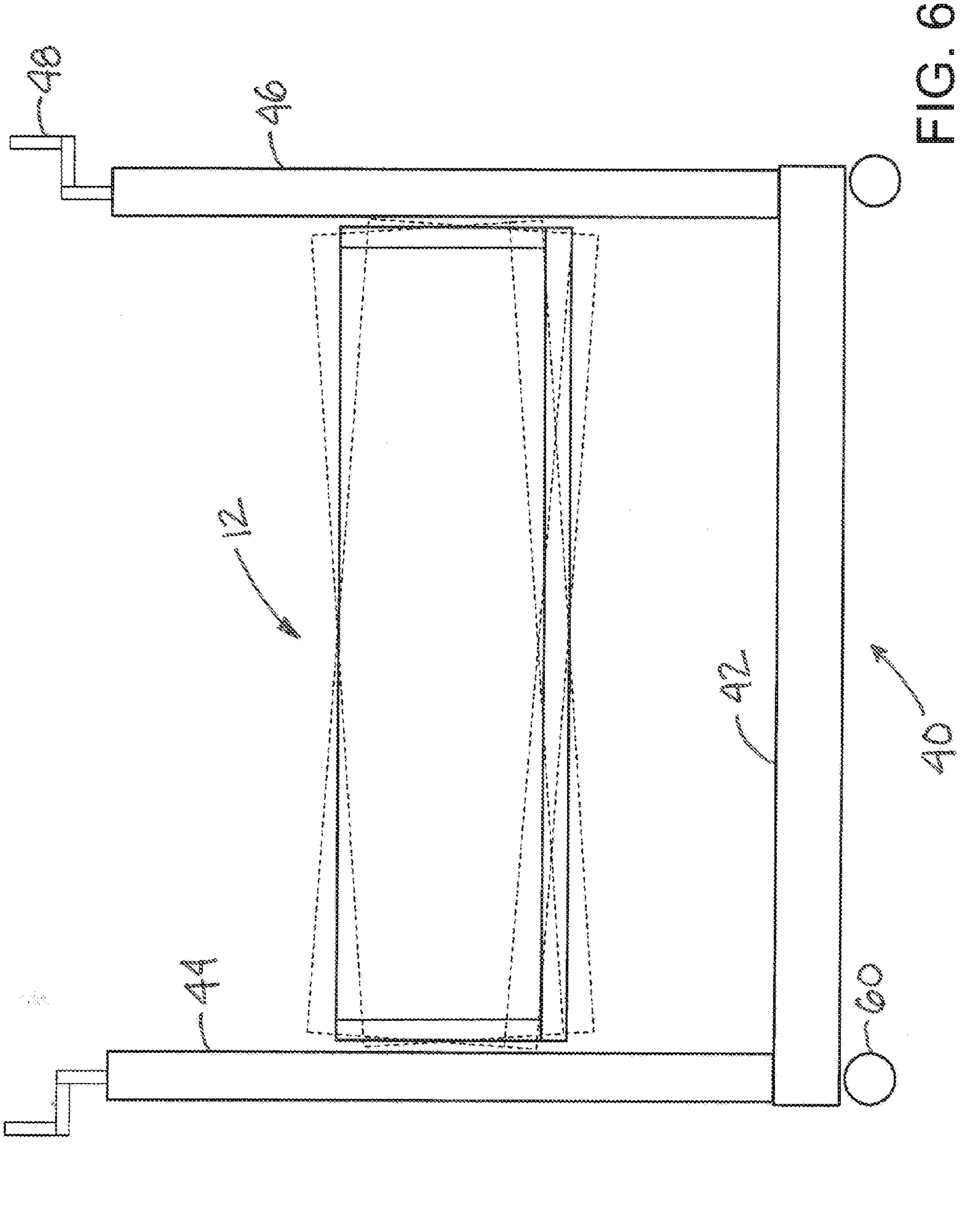
FIG. 6 is a schematic side view of the apparatus showing the end to end adjustability of the position of the support tray in broken lines, according to an illustrative embodiment.
Figure 7:
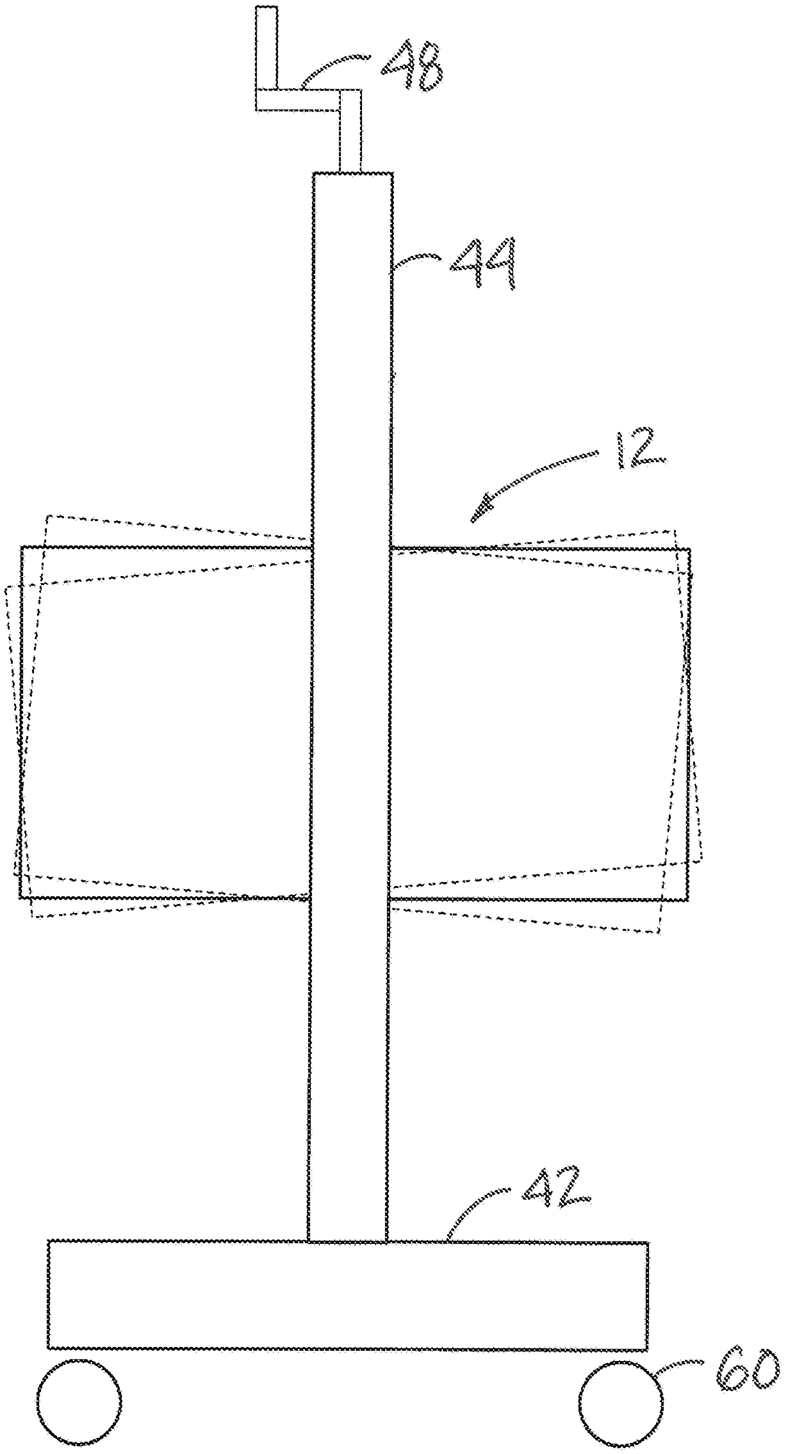
FIG. 7 is a schematic end view of the apparatus showing the side to side adjustability of the position of the support tray in broken lines, according to an illustrative embodiment.
Figure 8:
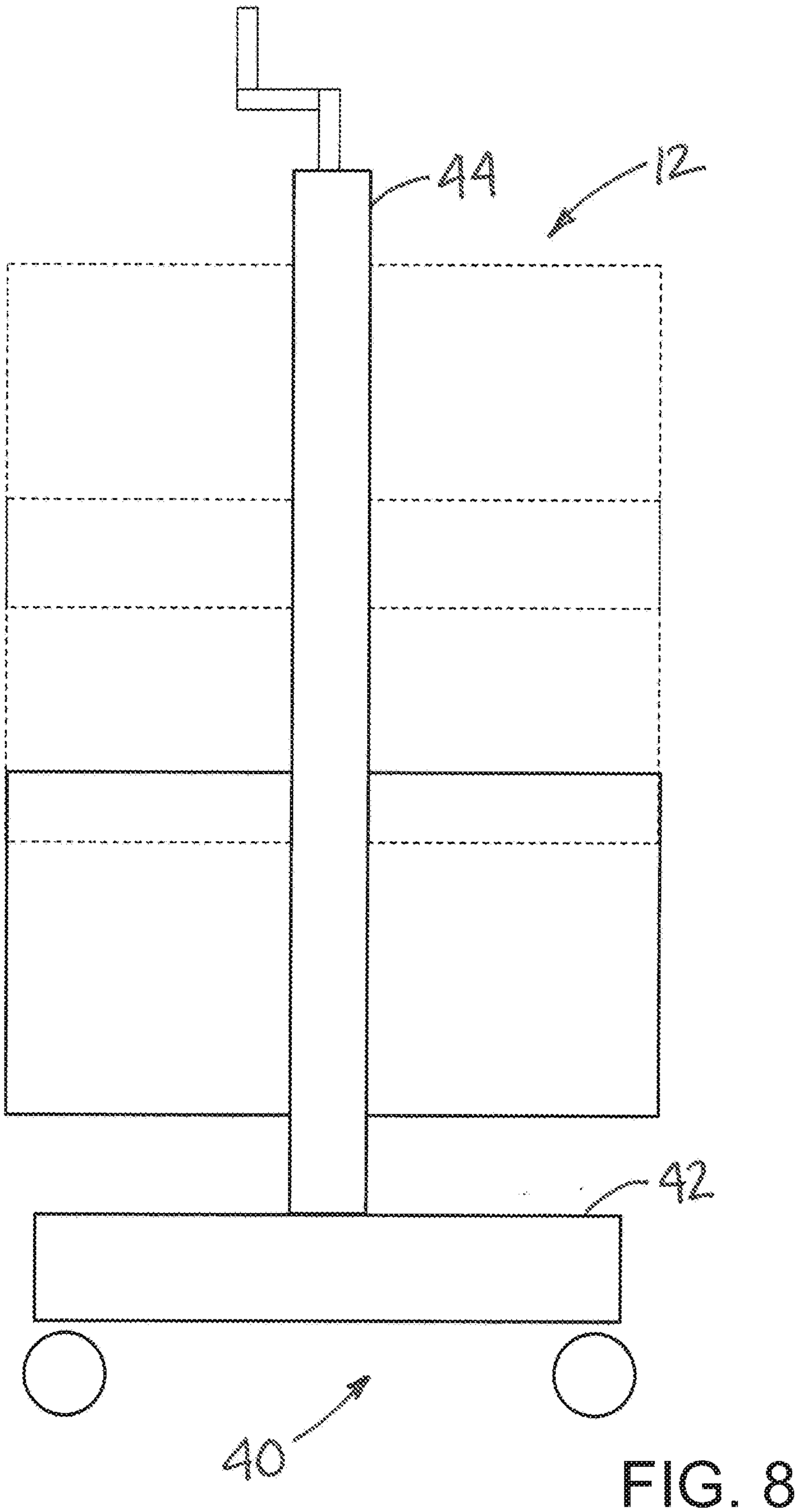
FIG. 8 is a schematic end view of the apparatus showing the vertical position adjustability of the support tray in broken lines, according to an illustrative embodiment.
Figure 9:
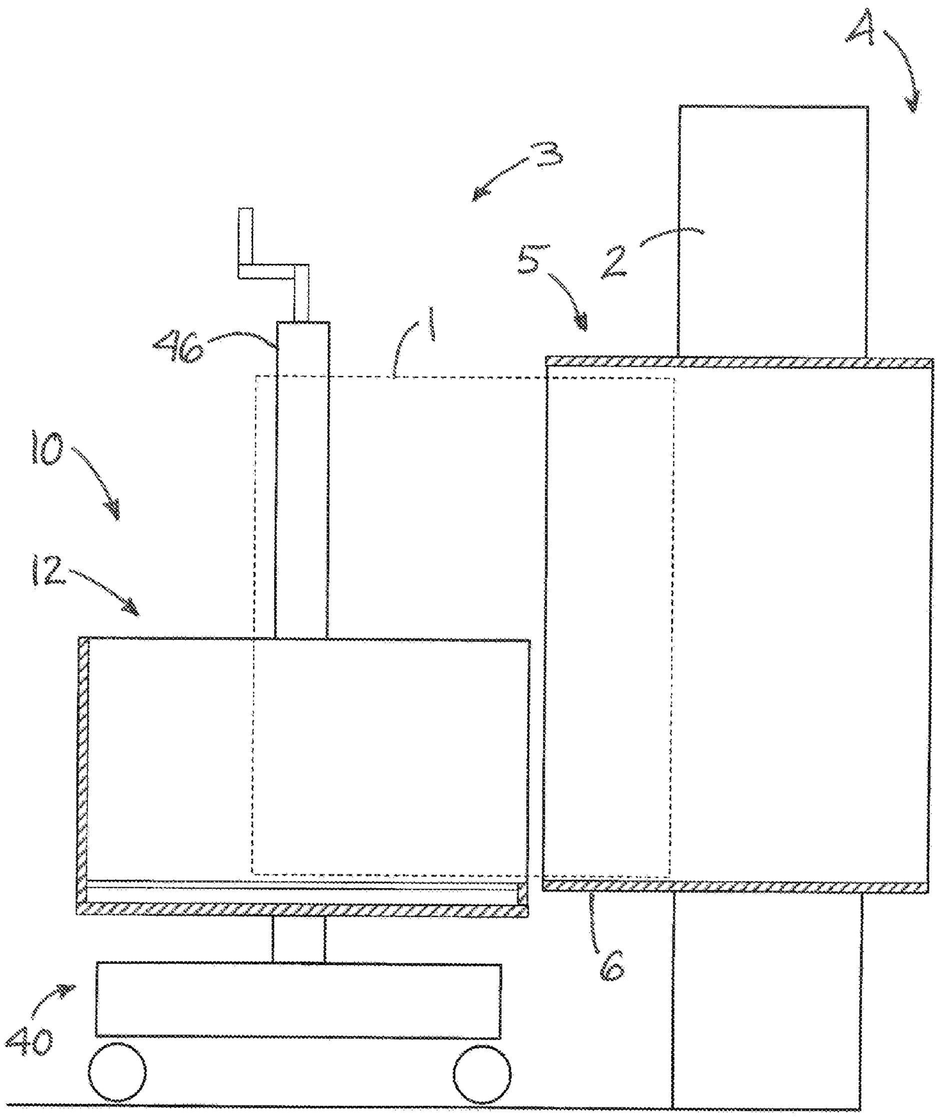
FIG. 9 is a schematic end sectional view of the transfer of an air handling unit between the apparatus and a mounting sleeve in an exterior wall of a building, according to an illustrative embodiment.

With reference now to the drawings, and in particular to FIGS. 1 through 9 thereof, a new cleaning apparatus for an air handling unit embodying the principles and concepts of the disclosed subject matter will be described.

The applicant has recognized that conventional techniques for cleaning air handling units, such as those that provide heating and/or air conditioning to a room space, are generally unsuitable for achieving a thorough cleaning of the unit. Typically, heat exchangers within the unit have air moving through finned coils, and dirt and other debris collect on these coils, making them less efficient for heat transfer. Heat transfer coils, as well as the fans moving air through the coils, are typically shrouded to facilitate efficient air movement which typically makes the fans and the coils difficult to access in the cleaning process. Removal of shrouds and other obstructing parts is time consuming and therefore is generally not done. Cleaning water or fluid may be directed at pressure through the heat exchangers to dislodge the dirt and debris, but this can expose electrical circuits and electronics to damaging moisture. As a result, most cleaning of the air handling units is only marginally effective. Moreover, when it is considered that a hotel may utilize up to 100 or more of these air handling units, a time consuming cleaning process conducted on all units could take several days if not weeks to complete.

The applicant has also recognized the limitation of existing cleaning techniques for the air handling units and have developed an apparatus that is highly suitable for permitting a single person to be able to move the unit from its mounting sleeve in a wall to the apparatus, as well as providing a space for effective cleaning of the unit and facilitating capture of the cleaning fluids and debris as both can be drawn into a suction apparatus such as a vacuum. Additionally, the applicants have recognized the need for an apparatus that is easily and substantially completely drainable such that the apparatus can be tipped on one end and easily moved into and out of the close quarters typically encountered in a hotel room without spilling cleaning fluid or losing dislodged debris when the apparatus is tipped.

Using apparatus of the nature disclosed herein, the operator may form one or more holes in the top of the shrouding bridging between the fans and the heat exchanger such that a cleaning wand may be inserted downwardly through the holes and into the space between the fans and coils in order to spray the coils and dislodge debris to fall into the pan located at the bottom of the unit to drain out through a drain hole in the pan. The fluid and debris may then drain into the support tray where the liquid and debris may be removed from the support tray through one or more of the drains incorporated into the apparatus.

In one aspect of the disclosure, an apparatus 10 is disclosed for temporarily supporting an air handling unit 1 during servicing of the unit, particularly cleaning but also operations such as repairing or replacing the unit. Illustratively, the air handling unit 1 may comprise a packaged terminal air conditioner (PTAC) which may be capable of providing environmental heating and cooling of a room or rooms of a building when partially positioned in the interior and exterior of a building. Typically the air handling unit 1 may be mountable on an exterior wall 2 of the building structure so that the unit is simultaneously in communication with air in the interior 3 of the building structure as well as air exterior to the building. The unit 1 may be mountable in a mounting sleeve 5 which extends through the exterior wall of the building structure so that the unit 1 is positioned in the mounting sleeve so that the unit 1 is exposed to both the exterior 4 and interior 3 of the building and may be able to move air between the interior and exterior. In some configurations, the mounting sleeve 5 may have a substantially rectangular cubical shape with a perimeter wall 6 forming the sleeve.

The apparatus 10 of the disclosure may include a support tray 12 for removably receiving the air handling unit 1, typically for the purpose of servicing the unit, but optionally for other purposes. The support tray 12 may define a space for the air handling unit 1 to move into from the mounting sleeve 5. The support tray 12 may have opposite sides 14, 15 and opposite ends 16, 17. One of the sides may be a front side 14 for orienting toward the air handling unit 1 to be received by the tray, and a rear side 15 for orienting away from the air handling unit to be received. Typically the front side of the tray is oriented toward the interior face of the air handling unit, although this is not necessary. The front side 14 of the tray may be substantially open so that the air handling unit is movable through the front side into the space of the support tray. The support tray 12 may have a substantially open top 18.

The support tray 12 may include a bottom wall 20 which may extend continuously between the ends of the support tray, as well as the sides 14, 15. The bottom wall may have an upper surface 22 for orienting towards the unit 1 when received in the support tray 12. In some embodiments, the upper surface may be configured to slope outwardly from a center of the tray. The support tray 12 may also include opposite first 24 and second 25 end walls which may extend upwardly from the bottom wall 20. The end walls 24, 25 may have a front side edge 26 which is located adjacent to the front side 14 of the support tray, and may also extend upwardly with respect to the upper surface 22 of the bottom wall 20. At least one of the end walls may have a movable portion 50 and a stationary portion 52, and the movable portion may be located toward the front side 14 of the support tray. The movable portion 50 may form a portion of the front side edge 26 of the side wall. The movable portion 50 may have an extended position (see broken lines in FIG. 5) and a retracted position (see solid lines in FIG. 5), and may be slidable between the positions. The movable portion may be at least partially overlapped with the stationary portion 52 when in the retracted position.

The support tray 12 may also include a side wall 28 which extends between the end walls 24, 25 and may be located toward the rear side 15 of the tray. The side wall 28 may be connected to the end walls 24, 25 to create a partial enclosure of the space of the support tray. In some embodiments, the side wall 28 may have an upper portion 54 and a lower portion 56, and the upper portion may be movable with respect to the lower portion. Illustratively, the upper portion may be swingable or tiltable outwardly and rearwardly from the open top 18 of the tray 12 to extend or expand the open top of the tray.

A side lip 30 may be included on the support tray 12 which extends upwardly from the bottom wall and may be located at the front side 14 of the support tray 12. The side lip 30 may be relatively shorter as compared to the side and end walls, and may thus form a shallow enclosure for receiving and holding liquids.

The support tray 12 may also include at least one slide rail 32 which may extend between the front and rear sides 14, 15 of the support tray for supporting a unit 1 positioned in the space of the tray at a distance above the upper surface 22 of the bottom wall 20. The slide rail 32 may be positioned above the bottom wall, and may be positioned adjacent to the upper surface of the bottom wall but may also be spaced from the upper surface such that a space is formed between a unit resting on the rail and the bottom wall. In some embodiments, a pair of the slide rails may be provided which may be spaced from each other and from the opposite ends 16, 17 of the support tray. At least one of the slide rails 32 may include a spacing element 36 which extends upwardly from the slide rail to resist or block movement of an air handling unit 1 in the support tray to thereby space the unit 1 from the rear side wall 28.

The apparatus 10 may also include a support frame 40 which is configured to support the support tray 12 above a ground surface. The support frame 40 may be configured to permit adjustment of the heights of the respective opposite ends of the support tray above the ground surface, and may be configured to permit the adjustment independent of each other such that the support tray may be tilted end to end. The support frame 40 may also be configured to permit the support tray to tilt side to side with respect to the support frame, such as by permitting pivoting of the support tray about a longitudinal horizontal axis. The support frame 40 may be configured to alternately raise and lower the front side 14 and rear side 15 of the support tray, although this is not necessarily the case. In embodiments in which both side-to-side and end-to-end tilt adjustment is permitted, the orientation of the tray may be adjusted to lower a corner of the tray with respect to other portions of the tray which tends to move fluids and debris in the tray toward the lowered corner.

The support frame 40 may include a base 42 which may extend between locations below the ends 16, 17 of the support tray 12. The frame 40 may also include a pair of end supports 44, 46 which generally extend upwardly from the base 42. Each end support 44, 46 may engage one of the opposite ends 16, 17 of the support tray to thereby support the respective end. In some embodiments, at least one of the end supports 44, 46 may be adjustable to extend and retract the end support to correspondingly increase and decrease a distance between the base 42 and a support tray 12 mounted on the respective support. An adjustable end support may have an actuator 28, which illustratively may comprise a jack with a rotatable handle located at the top of the end support in order to rotate the structure of the threaded jack to selectively extend or retract the end support. The jack may comprise, for example, a threaded rod rotated by the handle and a threaded nut mounted on an upper tube which telescopically receives the rod and a lower tube, although other configurations of the actuator may be employed.

The support frame 40 may include a pivot mechanism to facilitate the end to end pivot movement and the side to side pivot movement. The support tray 12 may be connected to at least one, and preferably each, of the end supports 44, 46 by a connector element 112. The connector element 112 may be connected to one of end supports by a first pivot 114 so that the element 112 is able to pivot with respect to end support along an axis oriented transverse to the length of the tray between the tray ends, and may be substantially horizontally oriented. The first pivot may comprise, for example, a pair of connector ears 116 formed on the connector element and a support ear 118 on the end that is pinned to the connector ears 116. The connector element 112 may be connected to one of the ends 16, 17 of the support tray 112 by a second pivot 120 so that the connector element is able to pivot with respect to the tray 12 about an axis oriented substantially parallel to the longitudinal length of the tray as well as being substantially horizontally oriented. The second pivot 120 may comprise a pin that extends through the connector element and the end wall of the tray, or a support bracket 122 mounted on the end of the support tray.

The support frame 40 may further include a locking assembly 58 which is configured to releaseably lock the support tray 12 against tilting side to side with respect to the support frame 40. The locking assembly may have a latch handle 59 which is movable between a lock position and a release position. The lock position may be characterized by the support tray 12 being locked against side-to-side tilt, and release position may be characterized by the support tray being released and capable to tilt in a side-to-side manner. Illustratively, the locking assembly 58 may include a locking lever 124 that is moved by the latch handle 59 and is able to engage a notch 126 formed on the connector element 112 when the latch handle is in the lock position and disengage or release from the notch when the latch handle 59 is moved to the release position. The lock position of the latch handle may, for example, lock the tray in a front side tilted orientation.

The apparatus 10 may also include a plurality of wheels 60 which are mounted on the support frame 40 in order to permit the frame to roll across a surface. Advantageously, the wheels may be located towards the ends of the support frame 40 in order to permit one end of the apparatus to be tilted upwardly and ride on a pair of wheels located at an end opposite of the raised end to facilitate movement of the apparatus in close quarters, such as in hotel rooms where beds or other furniture may be positioned relatively close to an air handling unit 1 to be serviced. Optionally, the wheels may also be positioned toward the corners of the support frame.

The apparatus 10 may also include at least one suction assembly 62 which is configured to remove fluids and debris from the support tray 12 which may be washed from the unit 1, such as through a drain hole in a drip pan incorporated into the unit. The suction assembly 62 may be mounted on the support tray and maybe located at an end of the support tray. In some implementations, a pair of the suction assemblies may be utilized with the suction assemblies being located at the ends 16, 17 of the support tray to facilitate the application of suction at both ends of the tray and enabling draining fluids from each end. The elements and relationships of the components of the pair of suction assemblies may be similar or substantially identical, and an illustrative configuration will be described with the understanding that another suction assembly may have a similar or substantially identical configuration. The suction assembly 62 may include at least one drain 64 which is located in one of the walls of the support tray and may be located in one of the end walls 24, 25, and may also be located adjacent to the upper surface 22 of the bottom wall 20 to receive fluids and debris on the upper surface. Advantageously, a suction assembly may include a pair of drains 64, 66 which may be located in the same end wall with a first drain 64 being located in the end wall adjacent to the side lip 30, and a second drain 66 located in the end wall adjacent to the side wall 28.

The illustrative suction assembly 62 may include a suction manifold 68 which is mounted on the support tray 12, and may be located adjacent to one of the end walls of the support tray, such as on the outside of the space defined by the tray. The suction manifold 68 may have an outlet interface end 70 which is configured to connect to a suction source, such as a hose connected to a vacuum cleaner which may be configured to receive wet and dry debris. In some embodiments, the suction manifold 68 may have a first inlet 72, a second inlet 74, and a third inlet 76 which define openings into the interior of the manifold. The suction manifold 68 may include a suction valve member 78 which is configured to switch suction from the connected suction source between at least the first 72 and second 74 inlets. The suction valve member 78 may be movable in the interior of the manifold between a first position in which suction is provided to first inlet 72 but not the second inlet 74, and a second position in which suction is provided to the second inlet 74 but not the first inlet. In some implementations, suction may be provided to the third inlet in both positions, or either of the positions. In some embodiments, the suction valve member 78 may be linked to the latch handle 59 of the locking assembly such that movement of the latch handle between the lock position and the release position moves the suction valve member between the first and second positions and between the respective drains as described herein.

The suction assembly 62 may also include a drain conduit 80 associated with each of the drains provided on the end of the tray. The drain conduit 80 may have an inlet 82 which is fluidly connected to one of the drains and an outlet 84 located at an opposite end of the conduit which may be fluidly connected to one of the inlets of the suction manifold. For example, a first drain conduit 80 may be connected to the first drain 64 on the support tray and the first inlet 72 of the suction manifold, and a second drain conduit 86 may be connected to the second drain 66 on the support tray and the second inlet 74 of the suction manifold.

The suction assembly 62 may also include a movable drain structure 88 which is configured to draw fluid and debris from a location that is not the support tray, such as, for example, from an interior of the air handling unit into the suction assembly. The movable drain structure 88 is highly useful for removing liquid and solid debris from a bottom pan of the air handling unit including liquid used in the cleaning process as well as debris loosened from the elements of the air handling unit during the cleaning process. The drain structure 88 may include a flexible conduit 90 which has a first end 92 mounted on and in fluid communication with the third inlet 76 of the suction manifold, and the first end may be removable from the third inlet for storage of the structure 88 during periods of non-use, and a cap may be provided to close the third inlet when the drain structure 88 is not connected.

The drain structure 88 may further include a suction fitting 94 located at a second end 96 of the conduit which may be configured to interface with a surface, such as the upper surface of a drain pan of the unit 1. The suction fitting may include a collar portion 98 with a suction edge 100 which is configured for abutting against the surface of the pan of the air handling unit. The suction edge 100 may lie substantially entirely in a common plane forming closely abutting a planar surface, but the edge 100 may also include at least one notch 102, and may advantageously include a plurality of notches which may be substantially uniformly spaced along the suction edge. The notch or notches may function to concentrate the suction or vacuum present in the conduit 90 at a few locations on the surface against which the edge 100 is abutted to form areas of relatively high suction that facilitate the removal of fluid and debris from the surface.

The suction fitting 94 may also include a securing portion 104 which is configured to hold the suction edge 100 of the collar portion against or in close proximity to a metallic surface, such as the surface of the drain pan of the air handling unit. The securing portion may be mounted on the collar portion 98 and may include a support 106 which extends from the collar portion and a magnet 108 which is mounted on the support 106. The magnet 108 may have a face 110 which is located in the same plane as the suction edge 100 such that when the face of the magnet abuts the metallic surface, the suction edge 100 is also held in close proximity to the surface.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An apparatus for temporarily supporting an air handling unit during servicing of the unit, the apparatus comprising:

a support tray defining a space for removably receiving the air handling unit, the support tray having opposite sides and opposite ends, a front side and top of the tray being substantially open such that the air handling unit is movable through the front side into the space of the support tray;

a support frame supporting the support tray above a ground surface on which the frame is rested;

a plurality of wheels mounted on the support frame to permit the frame to move across the ground surface, wherein the support frame is configured to permit the support tray to tilt end to end about a first axis with respect to the support frame to adjust heights of the opposite ends of the support tray above the surface; and wherein the support frame is configured to permit the support tray to tilt side to side about a second axis with respect to the support frame to adjust a height of the front side of the support tray above the surface, the second axis being oriented substantially perpendicular to the first axis.

2. The apparatus of claim 1 wherein the support frame is configured to alternately raise and lower the front and rear of the support tray.

3. The apparatus of claim 1 wherein the support tray comprises a bottom wall having an upper surface and extending between the ends of the support tray, opposite end walls extending upwardly from the bottom wall, a side wall extending between the end walls and located toward the rear of the support tray, and a side lip extending upwardly from the bottom wall at the front of the support tray.

4. The apparatus of claim 3 wherein the support tray further comprises at least one slide rail extending between the sides of the support tray and being positioned above the bottom wall for spacing an air handling unit resting on the rail from the upper surface of the bottom wall.

5. The apparatus of claim 3 wherein at least one of the end walls comprises a stationary portion and a movable portion located toward the front side of the support tray in an extended position of the movable portion and a retracted position in which the movable portion is retracted away from the front side of the tray.

6. The apparatus of claim 3 wherein the side wall has an upper portion and a lower portion, the upper portion being movable rearwardly with respect to the lower portion to extend the open top of the tray.

7. The apparatus of claim 1 wherein the support frame includes a base extending between locations below the ends of the support tray and a pair of end supports extending upwardly from the base, each end support engaging one of the opposite ends of the support tray to support the respective end of the tray, at least one of the end supports being actuatable to extend and retract said end support to increase and decrease a distance between the base and the support tray.

8. The apparatus of claim 7 wherein both of the end supports are independently actuatable to extend and retract said end supports to increase and decrease a distance between the base and the support tray.

9. The apparatus of claim 1 wherein the support frame includes a locking assembly configured to releasably lock the support tray against tilting side to side with respect to the support frame.

10. The apparatus of claim 1 wherein the first axis is oriented substantially horizontal and the second axis is oriented substantially horizontal.

11. The apparatus of claim 1 wherein the support frame is configured to adjust a vertical height of the support tray above the ground surface on which the frame is rested independent of tilting the support tray end to end and independent of tilting the support tray side to side.

12. An apparatus for temporarily supporting an air handling unit during servicing of the unit, the apparatus comprising:

a support tray defining a space for removably receiving the air handling unit, the support tray having opposite sides and opposite ends, a front side and top of the tray being substantially open such that the air handling unit is movable through the front side into the space of the support tray;

a support frame supporting the support tray above a ground surface on which the frame is rested;

a plurality of wheels mounted on the support frame to permit the frame to move across the ground surface, wherein the support frame is configured to permit the support tray to tilt end to end with respect to the support frame to adjust heights of the opposite ends of the support tray above the surface;

wherein the support frame is configured to permit the support tray to tilt side to side with respect to the support frame to adjust a height of the front side of the support tray above the surface; and at least one suction assembly configured to remove fluids from the support tray.

13. The apparatus of claim 12 wherein the suction assembly comprises a pair of suction assemblies with each of the suction assemblies being located at one of the ends of the support tray.

14. The apparatus of claim 12 wherein the at least one suction assembly includes at least one drain located in one of the walls of the support tray, the at least one drain being located adjacent to the upper surface of the bottom wall.

15. The apparatus of claim 14 wherein the at least one drain includes a first said drain located in a first said end wall adjacent to a side lip at the front side of the support tray and a second said drain located in the first end wall adjacent to a side wall opposite of the side lip.

16. The apparatus of claim 15 wherein the at least one suction assembly comprises a suction manifold mounted on the support tray, the suction manifold having an outlet interface end configured to connect to a suction source, the suction manifold having a plurality of suction inlets.

17. The apparatus of claim 16 wherein the suction manifold includes a suction valve member configured to switch suction between a first suction inlet and a second suction inlet of the plurality of suctions inlets.

18. The apparatus of claim 16 wherein the at least one suction assembly comprises a drain conduit associated with one of the drains, the drain conduit having an inlet fluidly connected to the respective drain and an outlet connected to one of the plurality of suction inlets on the suction manifold.

19. The apparatus of claim 16 wherein the at least one suction assembly includes a movable drain structure configured to draw fluid from an interior of the air handling unit into the suction assembly.

20. The apparatus of claim 19 wherein the drain structure includes a flexible conduit having a first end mounted on and in fluid communication with one of the suction inlets of the suction manifold, and a suction fitting located at a second end of the conduit.

21. The apparatus of claim 20 wherein the suction fitting includes a collar portion with a suction edge having at least one notch formed in the suction edge, and a securing portion configured to hold the suction edge of the collar portion against a surface.

22. The apparatus of claim 21 wherein the securing portion includes a support extending from the collar portion and a magnet mounted on the support for engaging a metallic surface.

* * * * *